(12) United States Patent
Caraher et al.

(10) Patent No.: US 6,264,353 B1
(45) Date of Patent: Jul. 24, 2001

(54) EXTERIOR MIRROR WITH SUPPLEMENT TURN SIGNAL

(75) Inventors: Thomas R. Caraher, Farmington Hills; John D. Youngs, Southgate, both of MI (US)

(73) Assignee: Lear Automotive Dearborn, Inc., Southfield, MI (US)

( * ) Notice: Subject to any disclaimer, the term of this patent is extended or adjusted under 35 U.S.C. 154(b) by 0 days.

(21) Appl. No.: 09/197,608

(22) Filed: Nov. 23, 1998

(51) Int. Cl.$^7$ .................................................. F21W 101/12
(52) U.S. Cl. .................... 362/494; 362/545; 362/800; 340/475
(58) Field of Search .................................. 362/494, 492, 362/800, 543, 544, 545; 340/475, 478

(56) References Cited

U.S. PATENT DOCUMENTS

| | | | |
|---|---|---|---|
| D. 394,833 | 6/1998 | Muth | D12/187 |
| D. 409,540 | 5/1999 | Muth | D12/187 |
| 4,274,078 | * 6/1981 | Isobe et al. | 362/494 |
| 4,882,565 | 11/1989 | Gallmeyer | 340/461 |
| 4,890,907 | * 1/1990 | Vu et al. | 362/494 X |
| 4,906,085 | 3/1990 | Sugihara et al. | 350/601 |
| 5,109,214 | 4/1992 | Heidman, Jr. | 340/475 |
| 5,207,492 | 5/1993 | Roberts | 362/30 |
| 5,285,060 | 2/1994 | Larson et al. | 250/214 |
| 5,313,335 | 5/1994 | Gray et al. | 359/839 |
| 5,361,190 | 11/1994 | Roberts et al. | 362/61 |
| 5,436,741 | 7/1995 | Crandall | 359/15 |
| 5,497,306 | * 3/1996 | Pastrick | 362/494 |
| 5,575,552 | 11/1996 | Faloon et al. | 362/83 |
| 5,587,699 | 12/1996 | Faloon et al. | 340/475 |
| 5,669,705 | 9/1997 | Pastrick et al. | 362/83.1 |
| 5,788,357 | * 8/1998 | Muth et al. | 362/494 |
| 5,938,320 | * 8/1999 | Crandall | 362/545 X |
| 6,005,724 | 12/1999 | Todd | 359/884 |

FOREIGN PATENT DOCUMENTS

| | | |
|---|---|---|
| 873910 | 10/1998 | (EP) . |
| 03050044 | 3/1991 | (JP) . |
| 05291418 | 11/1993 | (JP) . |
| 09175273 | 7/1997 | (JP) . |
| 9720709 | 6/1997 | (WO) . |

OTHER PUBLICATIONS

Magazine Advertisement for Muth Mirror Systems, published in "Motor Trend", Aug. 1998 at p. 144.
Photocopies labeled Photo 1 and Photo 2 of a side view mirror kit purchased from Muth Mirror Systems for a Dodge Dakota 1997–2000 vehicle.

* cited by examiner

*Primary Examiner*—Laura K. Tso
(74) *Attorney, Agent, or Firm*—MacMillan, Sobanski & Todd, LLC (57) ABSTRACT

A mirror apparatus for displaying a supplemental turn signal includes a housing, a reflective mirror glass, and a display section. The display section is positioned to direct a chevron-like display having a plurality of Light Emitting Diodes which produce a light signal such as a flashing turn signal through the mirror glass. By locally removing selective portions of the reflective surface, the mirror glass provides a reflective view in the conventional manner and the transparent portion allows direct transmission of the light signal from the display section. In another embodiment the mirror apparatus takes advantage of a flexible circuit board to conform the LEDs to the shape of the housing such that the light signal is displayed adjacent to the mirror glass.

7 Claims, 8 Drawing Sheets

EXTERIOR MIRROR WITH SUPPLEMENT TURN SIGNAL

BACKGROUND OF THE INVENTION

The present invention relates to exterior vehicle mirrors which include a supplemental turn signal, and more particularly to the use of a flexible circuit board allowing the turn signal display sections to conform to the surface of various exterior side mirrors and to reduce weight.

Current motor vehicles include turn signals at the front and rear of the vehicle to alert other drivers when the vehicle is turning or making a lane change. It is advantageous to make the turn signals as conspicuous as possible to an adjacent vehicle. However, styling considerations have generally dictated against the use of additional lights on the body of the vehicles.

It is known to project turn signals from the exterior mirrors of a vehicle to provide a prominent turn signal indication in addition to the mandated signal. One commercial exterior side mirror includes a turn signal indicator displayed in the mirror glass. The known mirror apparatus utilizes a mirror glass which is reflective of most visible light wavelengths but substantially transparent to a small predetermined band of light wavelengths. A turn signal indicator is displayed by an LED array behind the mirror glass generating light of the small predetermined wavelength. However, the method for manufacturing the mirror glass which transmits only the predetermined wavelength is expensive. In addition, the light sources required to generate light of the predetermined wavelength are more expensive than a light source which generates a wider spectrum of light wavelengths.

SUMMARY OF THE INVENTION

The present invention overcomes the problems encountered with conventional turn signal mirrors by providing a turn signal module which allows the use of a common array in various location of an external side mirror. Preferably, a display section adjacent the inventive mirror displays a turn signal which is visible to adjacent vehicles while providing the driver with the required "field of view" from the vehicle mirror. Alternate display sections display the turn signal directly through the exterior mirror glass without intrusion into the "field of view."

The mirror apparatus of the present invention generally includes a housing, a reflective mirror glass and a display section. The display section is positioned to direct a plurality of Light Emitting Diodes (LEDs) to produce a light signal such as a chevron-like flashing turn signal through the mirror glass. By locally removing selective portions of the reflective surface or coating, the mirror glass is provided with a transparent surface portion to allow transmittance of the light signal. The mirror glass therefore provides a reflective view in the conventional manner and the transparent surface portion, which can be defined by a plurality of individual windows. Accordingly, the removal of the reflective coating allows direct transmission of the light signal from the display section and further allows the use of standard mirror glass without the necessity of specialized dichroic coatings. It will be understood that various shapes and configurations can be provided by selectively removing desired portions of the reflective coating.

To arrange and mount the LEDs in a desired orientation within the housing, a module is preferably provided to conform the LEDs and a flexible circuit board to the desired location. In an alternate embodiment of the present invention the display section takes advantage of the flexible circuit board to conform the LEDs to the housing adjacent to or behind the mirror glass. In this embodiment the light signal does not pass through the mirror glass but conforms to the shape of the housing such that the light signal is displayed adjacent to the mirror glass.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
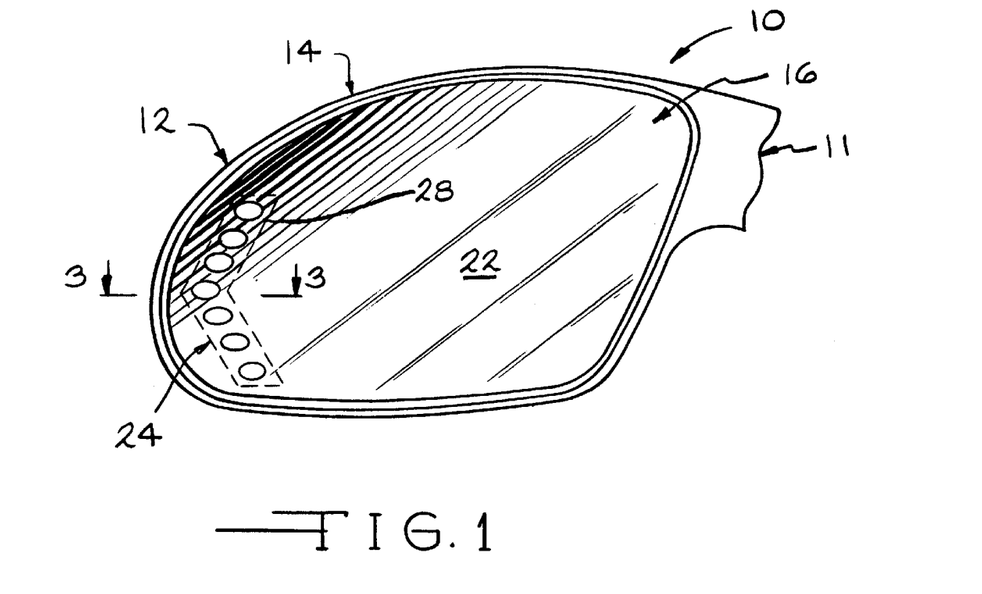
FIG. 1 is a front view of a mirror apparatus in accordance with the present invention.

A mirror apparatus 10 according to a first embodiment of the present invention, is shown in FIG. 1. Although the invention will be described and illustrated as a left exterior side mirror for an automotive vehicle, it should be understood that the present invention is also used for the right exterior side mirror. Further, although this invention is described in the context of providing information to the driver of adjacent vehicles, the light could also be used for other purposes. As an example, the light source could be used as a warning when doors are open and when doors are ajar.

As will be further described below the mirror apparatus 10 generally includes a housing 14 having an inboard side 11 an outboard side 12, a mirror glass 16 and a display section 24. The display section 24 is positioned to direct a light signal such as a flashing turn signal to a second observer adjacent the vehicle, while preferably preventing a first observer inside the vehicle from directly viewing the light source.

As shown in FIG. 1, the display section 24 provides a chevron-like display having a plurality of Light Emitting Diodes (LEDs) 26 (FIG. 3) which produce a light signal such as a flashing turn signal through the mirror glass 16. A mirror glass 16, as commonly known, is typically manufactured by integrating a reflective coating or film 22 on the front or rear of the mirror glass 16 to provide for the reflection of ambient light. Therefore, removal of the reflective coating allows for the direct transmission of light through the mirror glass 16. The mirror glass 16 is preferably mounted in a conventional manner such that the first observer inside the vehicle can adjust the reflective view adjacent the vehicle (not shown).

Figure 2:
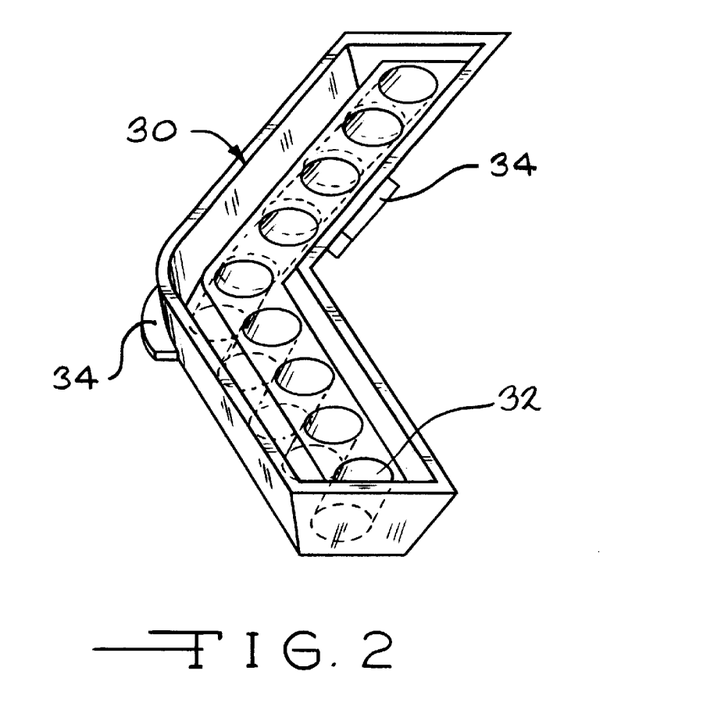
FIG. 2 is an expanded view of a display section in accordance with the present invention.

Individual windows 28 are preferably burned through the reflective coating of the mirror glass 16 to allow the light signal from the LEDs 26 to pass through. By locally burning away selective portions of the reflective surface 22 with a laser or the like, the mirror glass 16 is provided with a transparent surface portion which is defined by the individual windows 28 within the reflective surface 22. The mirror glass 16 therefore provides a reflective view in the conventional manner and individual windows 28 to allow the direct transmission of the light signal from the display section 24. As the transparent portion is preferably only a small portion of the mirror glass 16, the loss of reflective surface 22 area is minimized such that the mandated "field of view" is not compromised. As shown in FIGS. 1 and 2, the windows 28 are elliptical with a major, horizontally extending axis.

Additionally, as the individual windows 28 are formed by the selective removal of the reflective surface 22, the remaining transparent portion is formed by the underlying surface of the mirror glass 16 which allows a full spectrum of light to pass through. Therefore, by simply removing the reflective surface portion 22 in localized areas, the requirements of expensive coatings or films which maintain a reflective view while passing a particular wavelength of light is eliminated. Further, currently available commercial mirror glass can be adapted for use with the present invention as only the reflective surface portion 22 of a conventional mirror need be removed in the desired localized areas.

Although a plurality of individual windows 28 are illustrated, it will be understood that various shapes and configurations can be provided by selectively removing portions of the reflective coating. For example, the chevron can be an uninterrupted line instead of individual windows 28. Further, practically any shape can be created directly on the mirror glass 16, such as an arrow, bar, or the like. By arranging the plurality of LEDs 26 in a desired orientation, any type of signal can thus be displayed.

To arrange the LEDs 26 in a desired orientation, a module 30, as shown in FIG. 2 can be provided. The module 30, preferably includes a plurality of tunnels 32 for receipt of the individual LEDs 26. By canting the tunnels 32 toward the outboard side 12 of the housing 14 (FIG. 1) the light signal from the LEDs is directed to a second observer, while minimizing a first observer inside the vehicle (not shown) from directly viewing the light source. This prevents the first observer, such as a vehicle driver, from being distracted by a direct view of the light source.

Figure 3:
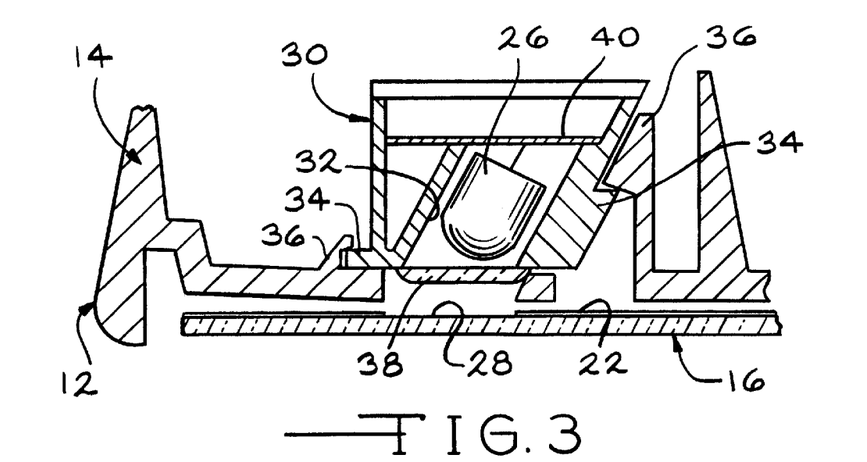
FIG. 3 is a cross-sectional view of the display section of the present invention taken along line 3—3 of FIG. 1.

A sectional view along line 3—3 of FIG. 1 is shown in FIG. 3. The module 30 is illustrated as attached to the housing 14 by tabs 34 and snap retainers 36. The module 30 preferably includes a lens 38 at an end of each tunnel 32 to protect the LEDs 26. Further, the module 30 provides support and retention for a flexible circuit board 40 which allows the LEDs 26 to conform to various surfaces and configurations. The lens 38 may be discreet to each tunnel 32 or comprise a single lens across the plurality of tunnels. Alternately, the lens 38 can comprise a part encompassing the LED array and the housing 14 they are mounted to. In another alternate construction, the lens may be co-injection molded as a part of the housing containing the tunnels for the LED array with a separate cover.

Figure 4:
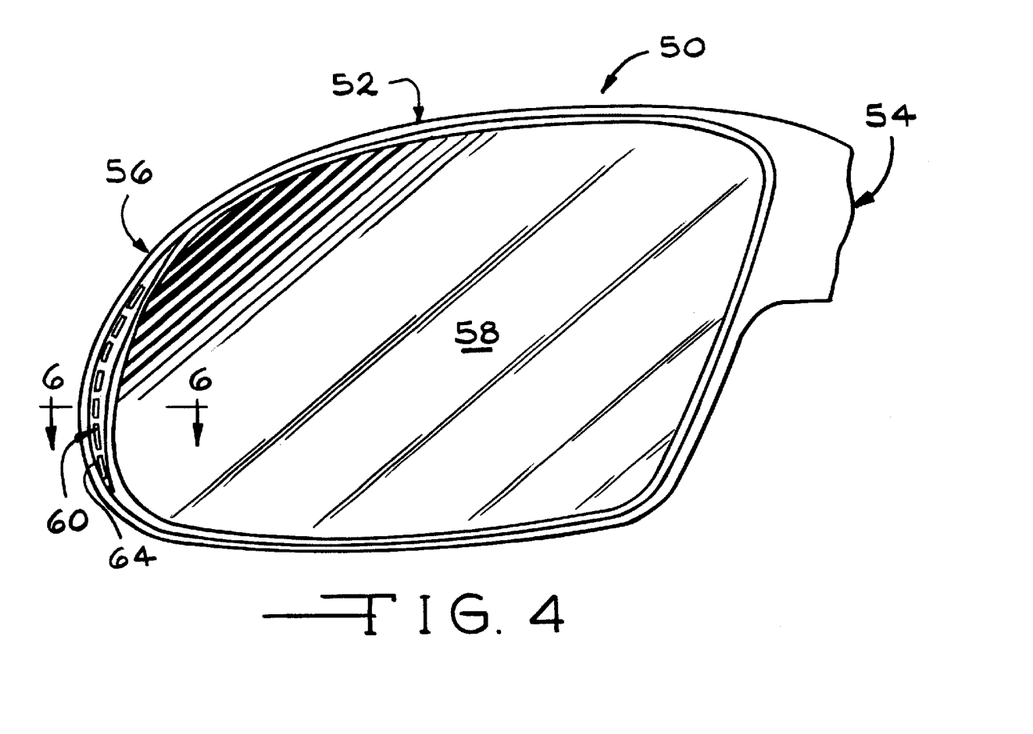
FIG. 4 is an alternate embodiment of a mirror apparatus shown in FIG. 1.

An alternate embodiment of the present invention is shown in FIG. 4. The mirror apparatus 50 generally includes a housing 52 having an inboard side 54 an outboard side 56, a mirror glass 58 and a display section 60. The display section 60 is positioned adjacent the mirror glass 58 to direct a light signal to a second observer adjacent said vehicle, while preferably preventing a first observer inside the vehicle from directly viewing the light signal. The display section 60 takes advantage of a flexible circuit board 62 to conform a LED array 64 to the housing 52 adjacent the mirror glass 58.

Figure 5:
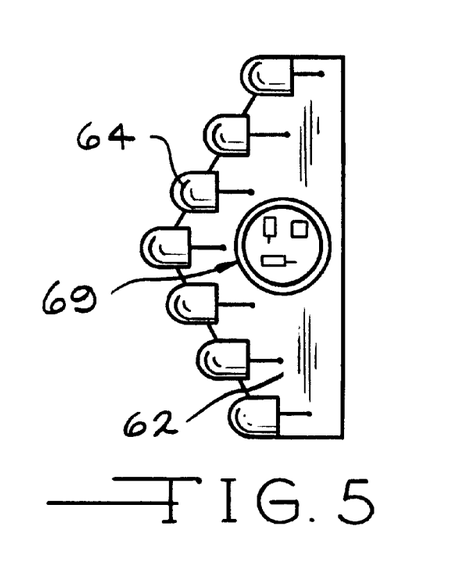
FIG. 5 is an expanded view of a flexible circuit board in accordance with the present invention.

As shown in FIG. 5, the LED array 64 is preferably a plurality of "tombstone" shaped LEDs, however it is to be understood that various types and shapes of lighting devices can be similarly adapted for use with the flexible circuit board 62. The flexible circuit board 62 advantageously allows the LED array 64 to conform to various curvalinear surfaces. It will be further understood that the module and array design is not restricted to use in areas adjacent the mirror glass. Flexible circuit boards are known, and the construction of such a board forms no portion of the present invention. The flexible circuit board 62 prevents the restriction of the LED array 64 to linear surfaces or single installation possibilities to therefore allow the use of a common array in different areas and both left and right exterior mirror assemblies without compromising the base design. That is, by using a flexible array, a common array can be used across a variety of housing shapes.

The electronic components 69 are preferably mounted in the center area of the flexible circuit board 62 to further allow the LED array 64 to be formed to the attached surfaces. Further, the LED array can be mounted to the flexible circuit board 62 at various angles to allow additional mounting possibilities. Accordingly, by mounting the electrical components 70 in the center of the board 62 and allowing for the flexibility of the LED array 64, the display section 60 can be commonly used with different module 66 assemblies (FIG. 6).

Figure 6:
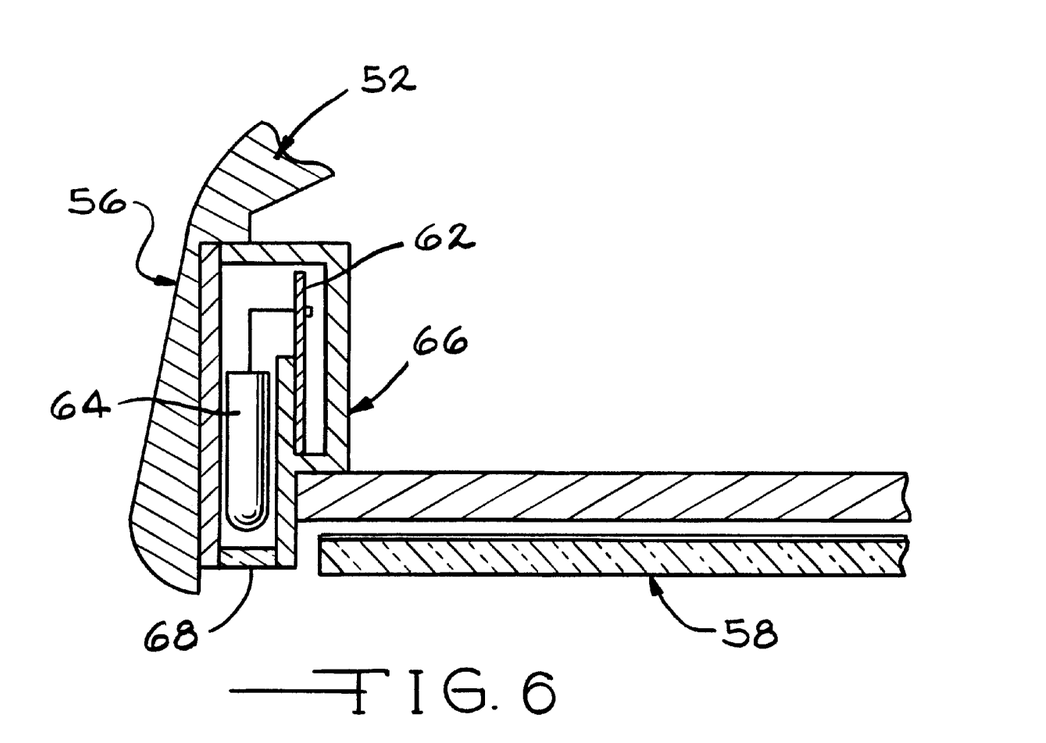
FIG. 6 is a cross-sectional view of the display section of the present invention taken along line 6—6 of FIG. 4.

A sectional view along line 6—6 of FIG. 4 is shown in FIG. 6. To arrange the LED array 64 in a desired orientation, a module 66 can be provided to retain and conform the flexible circuit board 62 and LED array 64 to the housing 52. The module 66 is illustrated as "snapped" into the housing 52 and preferably includes a lens 68 to protect the LED array 64. However, to supply a module 66 that can be used in multiple applications without introducing complexity, the present invention provides multiple attachment systems.

Additionally, the module 66 can be manufactured of a flexible material to allow conformal mounting possibilities in cooperation with the flexible circuit board 62 such that the module 66 is "flex-fit" to the desired surface.

The use of the flexible circuit board 62 which can be installed in various modules allows many mounting possibilities without the use of dedicated components. To provide a mounting system that can be used in multiple applications, it is preferred to provide multiple attachment systems that can be incorporated for use with the supplemental turn signals of the present invention. The mounting systems thus provide a secure attachment without increasing complexity. As will be further described below, there are basically two types of mounting methods, serviceable and non-serviceable.

Figure 7:
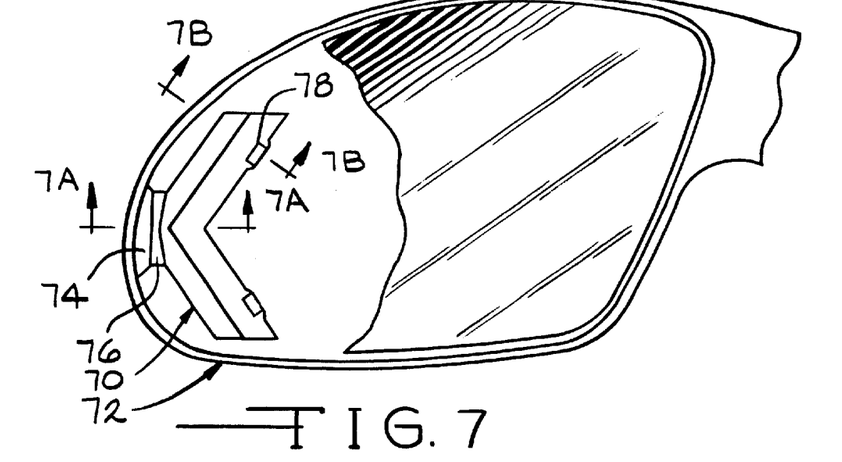
FIG. 7 is a front view of a mirror apparatus showing an alternate mounting arrangement of the display section in accordance with the present invention.
Figure 7A:
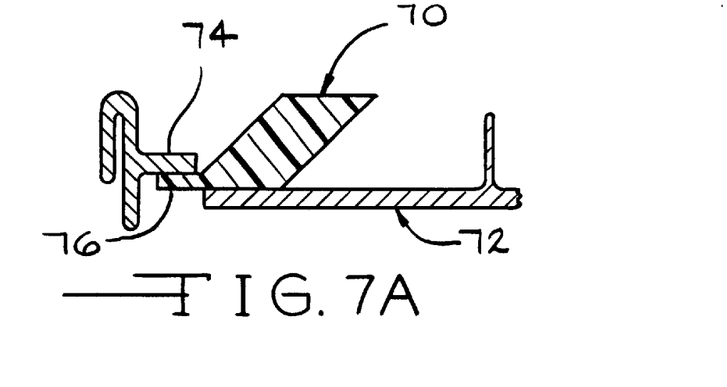
FIG. 7A is a cross-sectional view of the display section of the present invention taken along line A—A of FIG. 7.
Figure 7B:
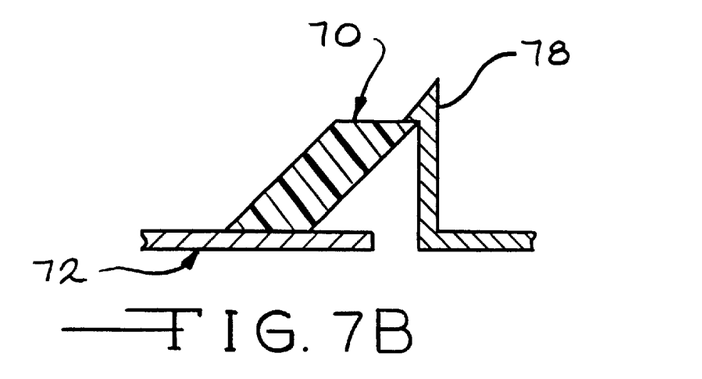
FIG. 7B is a cross-sectional view of the display section of the present invention taken along line B—B of FIG. 7.

As shown in FIG. 7, a serviceable mounting system allows the display section 70 to be inserted and removed within the housing 72 to thereby allow maintenance and part replacement within the display section 70. By this mounting system the display section 70 "snaps" in place. As shown in FIG. 7A, a cross-sectional view of the display section 70, a tab 76 integrally molded to the display section 70 slides under an associated tab 74, which is integral to the housing 72. To lock the display section 70 in place, a hook like member 78 retains the opposite portions of the display section 70.

Figure 8:
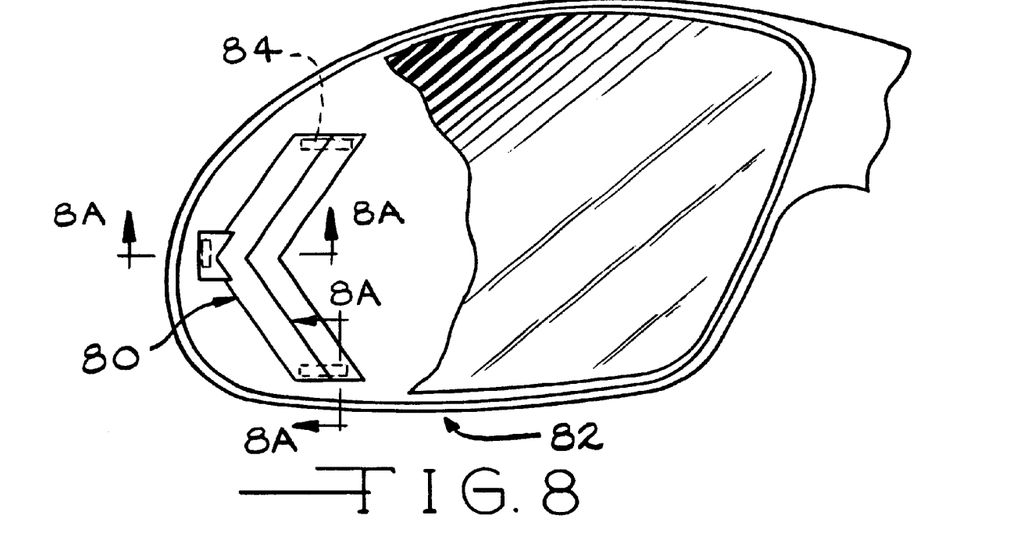
FIG. 8 is a front view of a mirror apparatus showing an alternate mounting arrangement of the display section in accordance with the present invention.
Figure 8A:
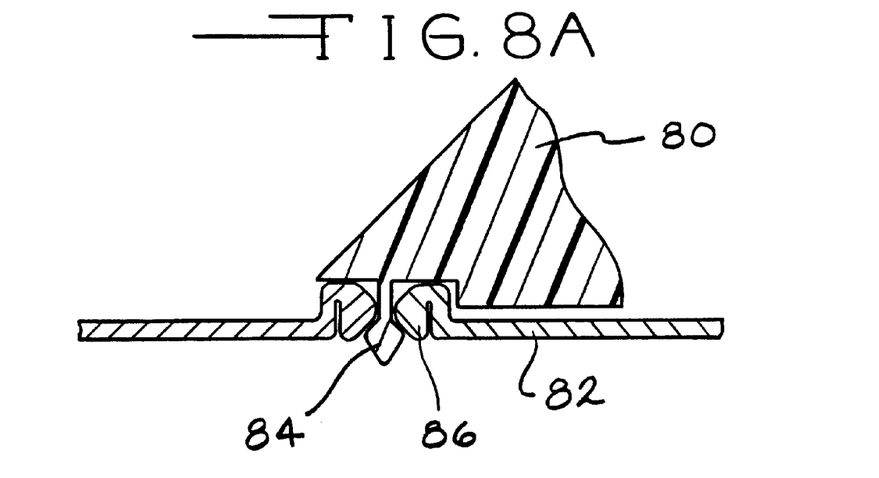
FIG. 8A is a cross-sectional view of the display section of the present invention taken along line A—A of FIG. 8.

As shown in FIG. 8, an alternate serviceable mounting system also allows the display section 80 to be inserted and removed from the housing 82. FIG. 8A is a cross-sectional view of the display section 80 taken along line A—A of FIG. 8. FIG. 8A shows the preferable identical three-point mounting arrangement including a "Christmas tree" like male connector 84 which is inserted into a receptor 86 integrally mounted in the housing 80. By providing identical attachment points, component commonality is increased and cost is reduced.

Figure 9:
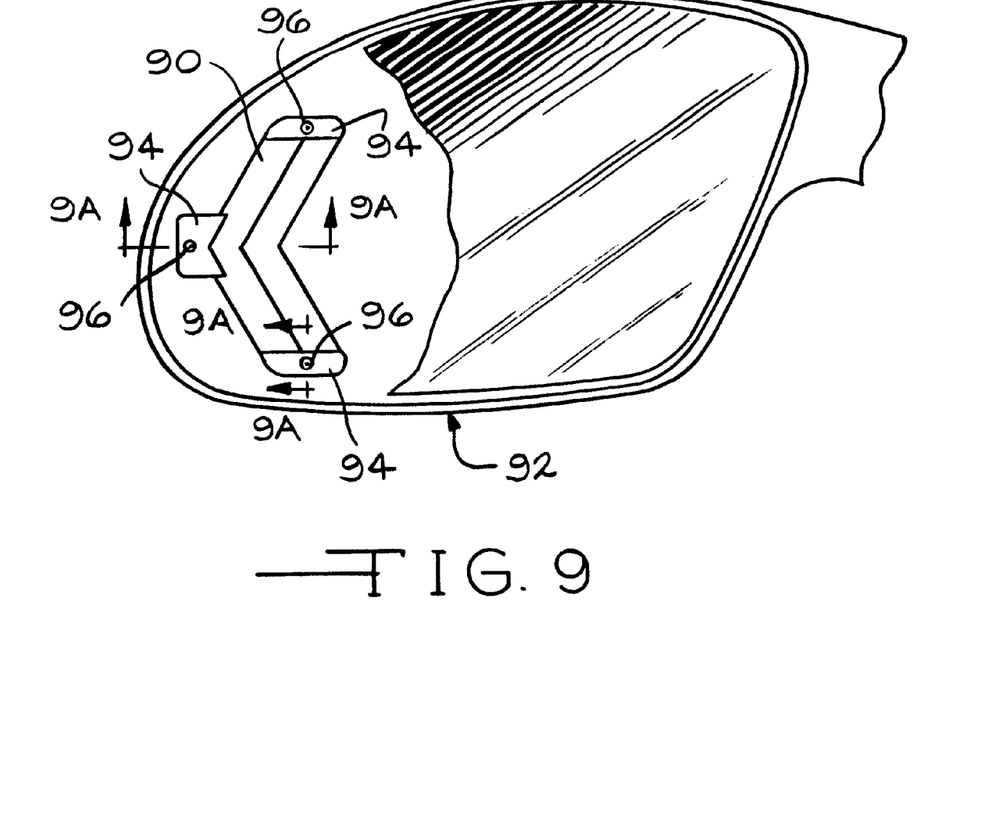
FIG. 9 is a front view of a mirror apparatus showing an alternate mounting arrangement of the display section in accordance with the present invention.
Figure 9A:
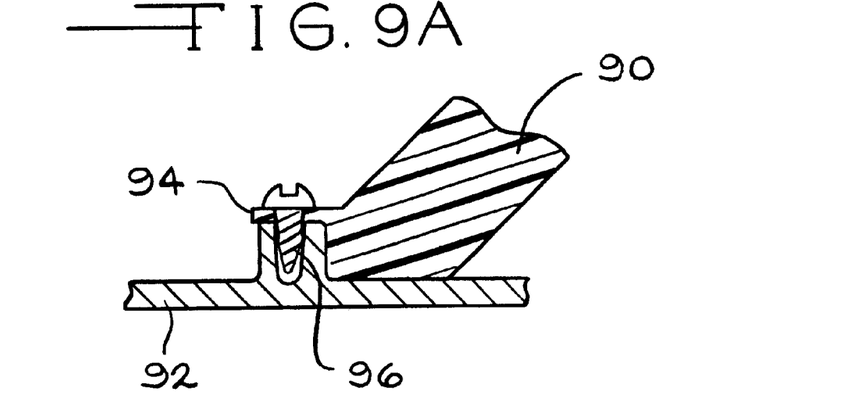
FIG. 9A is a cross-sectional view of the display section of the present invention along line A—A of FIG. 9.

FIG. 9 is yet another alternate serviceable mounting system which uses a common fastener 96 to anchor the display section 90 to the housing 92. As shown in FIG. 9A, a fastener 96 such as a screw, attaches a plurality of tab members 94 integrally molded to the display section 90 directly to the housing 92.

Figure 10:
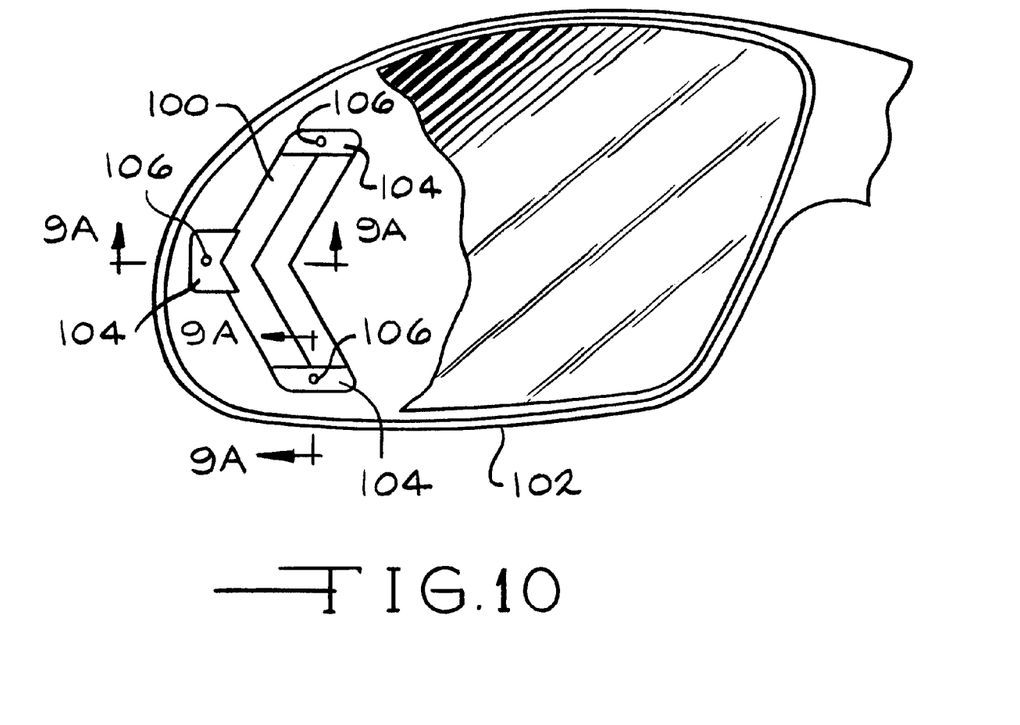
FIG. 10 is a front view of a mirror apparatus showing an alternate mounting arrangement of the display section in accordance with the present invention.
Figure 10A:
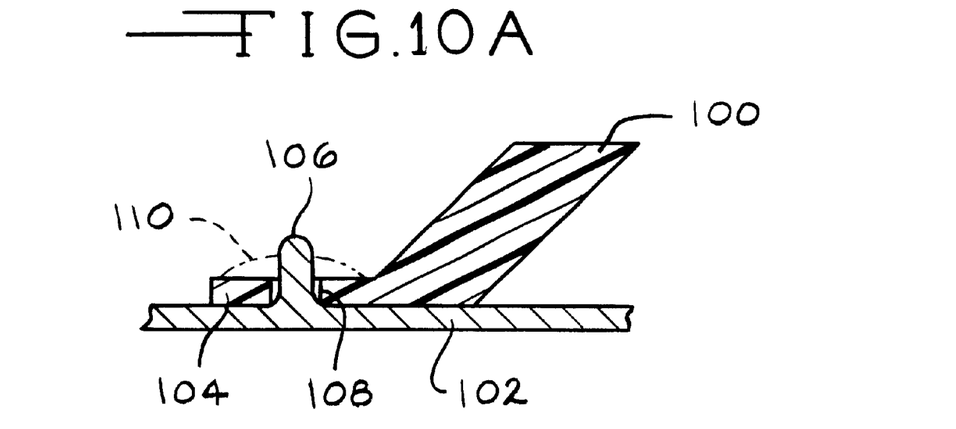
FIG. 10A is a cross-sectional view of the display section of the present invention taken along line A—A of FIG. 10.

As shown in FIG. 10, a non-serviceable heat-stake mounting system permanently attaches the display section 100 to the housing 102. FIG. 10A illustrates a cross-sectional view of the display section 100 tabs 104 of the present invention taken along line A—A of FIG. 10. As shown in FIG. 10A, a pin 106 passes through a corresponding hole 108 in each mounting tab 104. After the display section 100 is fitted to the pins 106 of the housing 102, the pins 106 are heated to create a head 110 which retains the display section 100 to the housing 102. Although this mounting system is non-serviceable, it advantageously eliminates components and simplifies retention.

Figure 11:
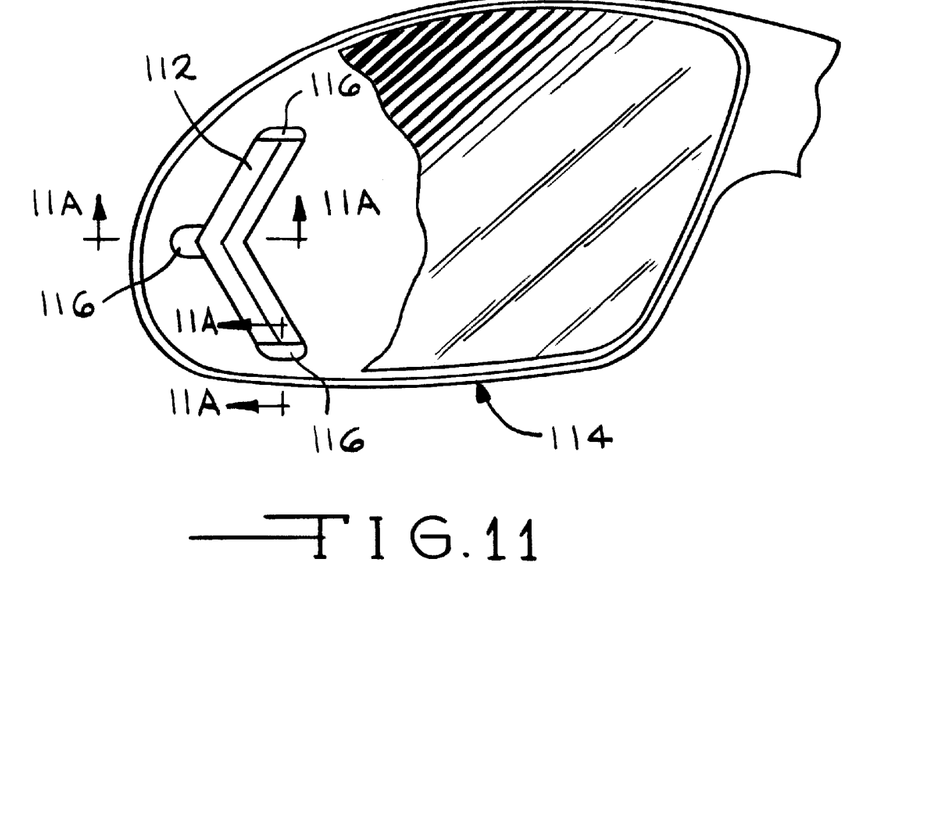
FIG. 11 is a front view of a mirror apparatus showing an alternate mounting arrangement of the display section in accordance with the present invention.
Figure 11A:
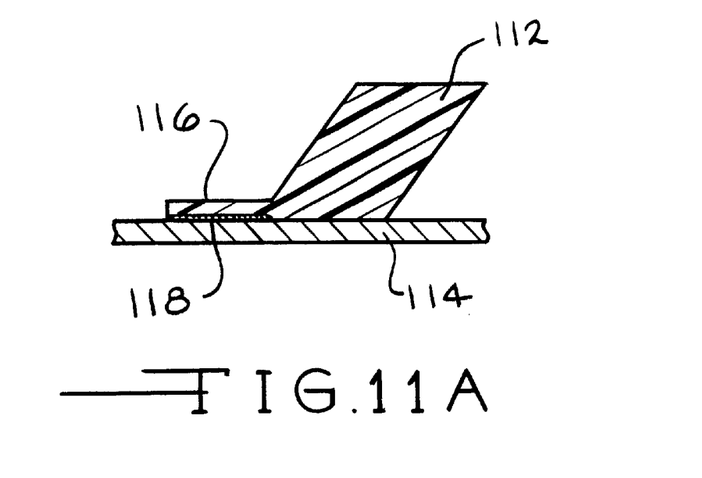
FIG. 11A is a cross-sectional view of the display section of the present invention taken along line A—A of FIG. 11.

Yet another non-serviceable mounting system which permanently attaches the display section 112 to the housing 114 is shown in FIG. 11. FIG. 11A illustrates a cross-sectional view of the display section 112 mounting tabs 116 of the present invention taken along line A—A of FIG. 11. As shown in FIG. 11A, the mounting tabs 116 are sonically welded 118 directly to the housing 114. Although this mounting system shows the sonic welds 118 placed along tabs 116, it will be understood that this type of attachment can be located in other display section 112 areas as well.

The adaptability of the above mounting systems thus allow many conventional mirror assemblies to be retrofit with the supplemental turn signal of the present invention.

The present invention has been described in an illustrative manner, and it is to be understood that the terminology which has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A rear view mirror apparatus for a motor vehicle comprising:

a housing adapted to be mounted on the vehicle, said housing provided with an inner surface portion having a predetermined curvalinear contour;

a mirror glass providing a reflective view, said mirror glass mounted in said housing and having an outer edge portion spaced inwardly from said inner surface portion of said housing; and a display section for selectively generating a light signal, said display section positioned between said inner surface portion of said housing and said outer edge portion of said mirror glass;

said display section including a plurality of LEDs arranged in a predetermined pattern on a flexible circuit board, said circuit board supported within said housing such that said board flexes to substantially conform to said predetermined curvalinear contour of said mirror housing.

2. The mirror apparatus of claim 1, wherein said housing has an inboard side and an outboard side, said display section having a light emitting diode canted toward said outboard side.

3. A rear view mirror apparatus for a motor vehicle comprising:

a housing adapted to be mounted to the exterior of the vehicle;

a mirror glass mounted in said housing, said mirror glass including a reflective surface portion and a plurality of individual, substantially transparent windows formed therein, the windows arranged in a predetermined pattern to provide a vehicle turn signal indicator; and a display section mounted within a module behind said mirror glass for selectively generating a light signal, said display section including a plurality of LEDs corresponding to the number of said windows, said LEDs being arranged in said predetermined pattern and being positioned such that each LED directs light through a separate one of said windows to generate said turn signal indicator.

4. A rear view mirror apparatus according to claim 3 wherein at least one of said windows is generally elliptical with a generally horizontally extending major axis.

5. A rear view mirror apparatus according to claim 4 wherein the one LED associated with said one elliptical window is canted to direct light outwardly away from the vehicle through said one elliptical window.

6. A rear view mirror apparatus according to claim 3 wherein said predetermined pattern is a chevron pattern.

7. A rear view mirror apparatus according to claim 3 wherein said module is removably attached to the backside of said mirror glass.

* * * * *